(12) United States Patent
Xia et al.

(10) Patent No.: US 12,157,090 B2
(45) Date of Patent: Dec. 3, 2024

(54) SPIRAL WOUND BIPOLAR ELECTRODIALYSIS CELL

(71) Applicant: Vetco Gray Scandinavia AS, Stravanger (NO)

(72) Inventors: Zijun Xia, Shanghai (CN); Chengqian Zhang, Shanghai (CN); Wujun Rong, Shanghai (CN); Yongchang Zheng, Westborough, MA (US); Bruce Batchelder, Burlington, MA (US); John H. Barber, Guelph (CA); Lei Cao, Shanghai (CN); Hua Wang, Niskayuna, NY (US); David Michael Stachera, Guelph (CA); Bo Yan, Shanghai (CN)

(73) Assignee: Vetco Gray Scandinavia AS (NO)

( * ) Notice: Subject to any disclaimer, the term of this patent is extended or adjusted under 35 U.S.C. 154(b) by 1058 days.

(21) Appl. No.: 16/607,537

(22) PCT Filed: Mar. 1, 2017

(86) PCT No.: PCT/CN2017/075305
§ 371 (c)(1),
(2) Date: Oct. 23, 2019

(87) PCT Pub. No.: WO2018/157327
PCT Pub. Date: Sep. 7, 2018

(65) Prior Publication Data
US 2020/0070093 A1    Mar. 5, 2020

(51) Int. Cl.
*B01D 61/00*    (2006.01)
*B01D 61/44*    (2006.01)
(Continued)

(52) U.S. Cl.
CPC ......... *B01D 61/445* (2013.01); *B01D 63/101* (2022.08); *B01D 63/107* (2022.08);
(Continued)

(58) Field of Classification Search
CPC ...... B01D 24/00; B01D 24/001; B01D 27/00; B01D 27/005; B01D 27/02; B01D 27/04;
(Continued)

(56) References Cited

U.S. PATENT DOCUMENTS 4,019,988 A * 4/1977 Ziegler ................ B01D 63/101
                                                              210/494.1
5,376,253 A * 12/1994 Rychen .................. B01D 61/46
                                                              204/632
(Continued)

FOREIGN PATENT DOCUMENTS

CN    1769196 A    5/2006
CN    1824610 A    8/2006
(Continued)

OTHER PUBLICATIONS

Environ. Sci. Technol. 2006, 40, 5233-5243 (Year: 2006).*
(Continued)

*Primary Examiner* — Allison G Fitzsimmons
(74) *Attorney, Agent, or Firm* — Baker Hughes Patent Group

(57) ABSTRACT

An electrodialysis cell includes a housing defining an internal chamber, a core positioned within the internal chamber, a first electrode positioned in the internal chamber adjacent the housing, a second electrode coupled to the core and spaced from the first electrode, and a membrane assembly positioned between the first and second electrodes in a spiral wound configuration. The housing includes an inlet end for receiving a feed fluid and an outlet end in fluid communication with the inlet end. The membrane assembly includes (Continued)

a plurality of ion exchange membranes spaced from each other to define a plurality of fluid channels between the inlet and outlet ends.

8 Claims, 10 Drawing Sheets

(51) Int. Cl.
    *B01D 63/10*     (2006.01)
    *C02F 1/469*     (2023.01)
    *C02F 1/00*     (2023.01)
    *C02F 103/08*     (2006.01)

(52) U.S. Cl.
    CPC ........ *C02F 1/4693* (2013.01); *B01D 2325/42* (2013.01); *C02F 2103/08* (2013.01)

(58) Field of Classification Search
CPC ........ B01D 27/08; B01D 27/06; B01D 29/00; B01D 29/0002; B01D 29/0004; B01D 29/0018; B01D 29/0027; B01D 29/0022; B01D 29/0029; B01D 29/0093; B01D 29/0095; B01D 29/01; B01D 29/50; B01D 35/00; B01D 35/30; B01D 35/301; B01D 35/303; B01D 35/306; B01D 36/00; B01D 36/003; B01D 39/00; B01D 63/00; B01D 63/10; B01D 63/14; B01D 67/00; B01D 67/0002; B01D 67/0079; B01D 67/00791; B01D 69/00; B01D 69/02; B01D 69/04; B01D 69/10; B01D 69/107; B01D 71/00; B01D 71/06; B01D 2201/29; B01D 2201/30; B01D 2221/00; B01D 2221/02; B01D 2221/12; B01D 2313/20; B01D 2313/201; B01D 2319/00
See application file for complete search history.

(56) References Cited

U.S. PATENT DOCUMENTS

| | | | |
|---|---|---|---|
| 8,173,003 B2 | 5/2012 | Li | |
| 9,359,226 B2 | 6/2016 | Chang-Hyun et al. | |
| 2004/0079704 A1* | 4/2004 | Garde | B01D 61/445 210/649 |
| 2006/0137986 A1* | 6/2006 | Holmes | F16K 31/041 137/247.13 |
| 2007/0051684 A1* | 3/2007 | Grebenyuk | C02F 1/4695 210/681 |
| 2011/0042218 A1* | 2/2011 | Hawkins | B01D 61/445 29/592.1 |

FOREIGN PATENT DOCUMENTS

| | | |
|---|---|---|
| CN | 201089733 Y | 7/2008 |
| CN | 102674596 A | 9/2012 |

OTHER PUBLICATIONS

Strathmann, Apr. 30, 2005, Wiley Online Library, https://doi.org/10.1002/14356007.a16_187.pub2 (Year: 2005).*
International Search Report of the International Searching Authority for PCT/CN2017/075305 with mailing date of Dec. 5, 2017.

* cited by examiner

SPIRAL WOUND BIPOLAR ELECTRODIALYSIS CELL

BACKGROUND

The field of the disclosure relates generally to electrodialysis cells, and more specifically, to spiral-wound, bipolar electrodialysis cells.

Electrodialysis cells use electric potential to separate a feed fluid into several output streams. In particular, electrodialysis cells include a stack of flat ion exchange membranes that are arranged in a spaced apart configuration to define a set of fluid channels. The membranes are positioned between two electrodes. When current is applied to the electrodes, ions from the feed fluid travel towards each electrode. The membranes selectively pass either negatively charged or positively charged ions while inhibiting ions of the opposite charge from passing through. The selective passing of ions through the membranes creates a plurality of output streams having different concentrations of acids, bases, and/or salts. In one example, electrodialysis cells are used for desalination of seawater (e.g., for generating potable water).

However, at least some known electrodialysis cells in the stack configuration (also known as a "plate and frame" configuration) are not suitable for deep sea and/or other high pressure environments. For example, plate and frame electrodialysis cells expose the edges of membranes to the external environment. A shunt current between the electrodes may develop through the seawater surrounding the stack. Additionally, the ambient pressure of the environment may damage the stack of membranes. Although a pressure vessel may be built for the plate and frame configuration, the pressure vessel must be occupied by a high pressure inert gas to balance the ambient pressure, which may significantly increase costs of the electrodialysis cell.

BRIEF DESCRIPTION

In one aspect, an electrodialysis cell includes a housing defining an internal chamber, a core positioned within the internal chamber, a first electrode positioned in the internal chamber adjacent the housing, a second electrode coupled to the core and spaced from the first electrode, and a membrane assembly positioned between the first and second electrodes in a spiral wound configuration. The housing includes an inlet end for receiving a feed fluid and an outlet end in fluid communication with the inlet end. The membrane assembly includes a plurality of ion exchange membranes spaced from each other to define a plurality of fluid channels between the inlet and outlet ends.

In another aspect, an electrodialysis system includes a fluid pump that transfers a feed fluid and an electrodialysis cell in fluid communication with the fluid pump. The electrodialysis cell includes a housing defining an internal chamber, a core positioned within the internal chamber, a first electrode positioned in the internal chamber adjacent the housing, a second electrode coupled to the core, and a membrane assembly positioned between the first and second electrodes in a spiral wound configuration. The housing includes an inlet end for receiving the feed fluid and an outlet end in fluid communication with the inlet end. The second electrode is spaced from the first electrode. The membrane assembly includes a plurality of ion exchange membranes spaced from each other to define a plurality of fluid channels between the inlet and outlet ends.

In yet another aspect, a method for assembling an electrodialysis cell is provided. The method includes coupling a membrane assembly to a core including a first electrode, winding the membrane assembly around the core in a spiral wound configuration, inserting the wound membrane assembly and the core into an internal chamber of a housing, positioning, within the internal chamber, a second electrode between the housing and the membrane assembly, and sealing the membrane assembly within the internal chamber. The membrane assembly includes a plurality of ion exchange membranes spaced from each other to define a plurality of fluid channels. The housing includes an inlet end and an outlet end. The fluid channels facilitate fluid communication between the inlet and outlet ends. The membrane assembly is positioned between the first and second electrodes. The inlet end includes an inlet nozzle to transfer a feed fluid to the plurality of fluid channels and the outlet end includes a set of outlet nozzles to transfer at least one output fluid from the plurality of fluid channels.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

The systems and methods described herein facilitate using spiral-wound, bipolar electrodialysis cells in relatively high-pressure environments (e.g., submerged environments). The systems and methods described herein include at least one electrodialysis cell including a housing, a core, a first electrode, a second electrode, and a membrane assembly. The housing defines an internal chamber and includes an inlet end that receives a feed fluid and an outlet end in fluid communication with the inlet end. The core is positioned in the internal chamber adjacent to the housing. The second electrode is coupled to the core and is spaced from the first electrode. The electrodes are electrically coupled to a power supply to receive power. The membrane assembly is positioned between the first and second electrodes in a spiral wound configuration around the core. The membrane assembly includes a plurality of ion exchange membranes that are spaced apart from each other to define a plurality of fluid channels between the inlet end and the outlet end. The membrane assembly receives the feed fluid and separates the feed fluid into a plurality of output streams when a predetermined electric current is applied between the first and second electrodes by inhibiting ions from passing through the ion exchange membranes.

Figure 1:
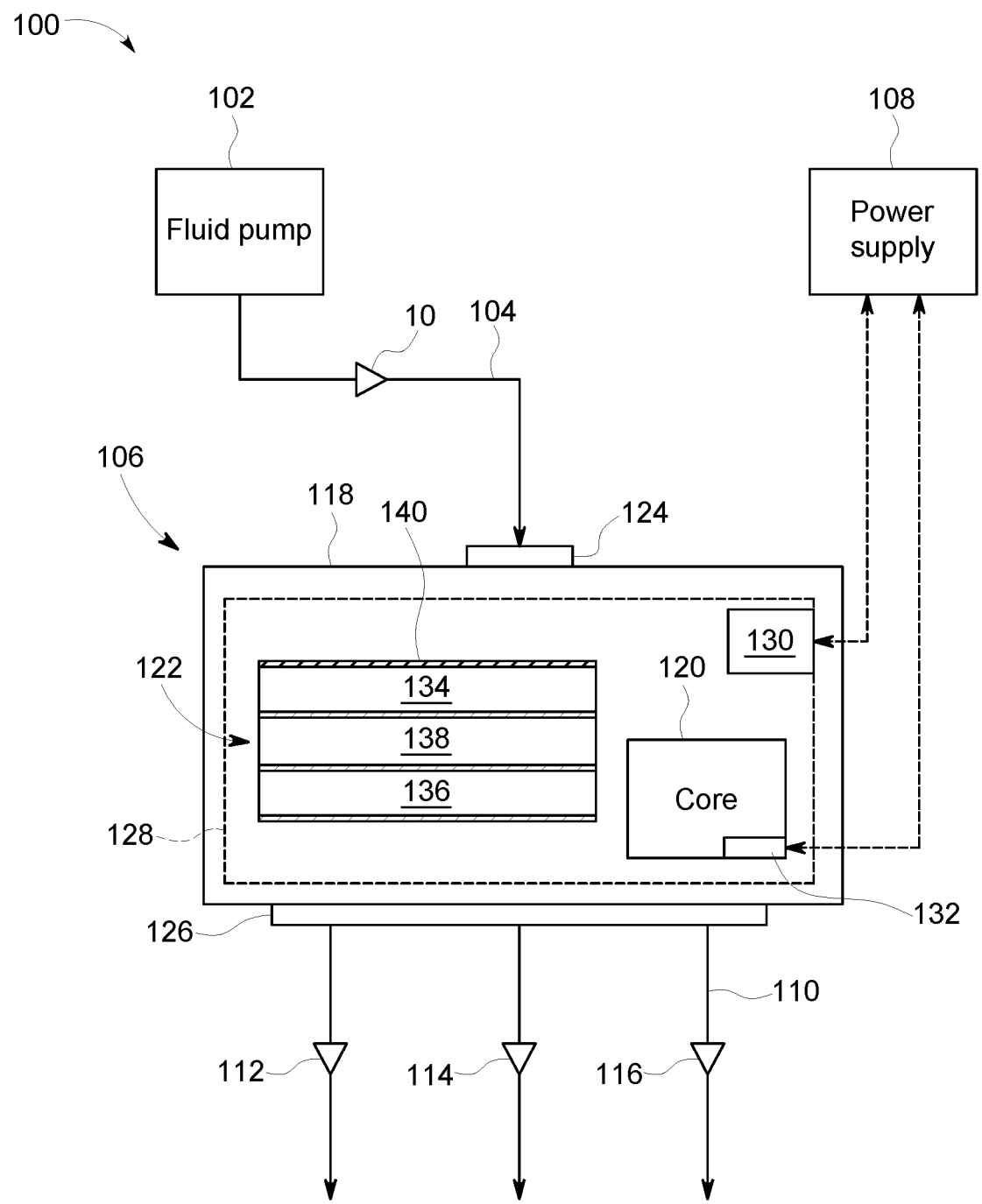
FIG. 1 is a block diagram of an exemplary spiral wound electrodialysis system.

FIG. 1 is a block diagram of an exemplary electrodialysis system 100. System 100 includes a fluid pump 102, an inlet tube 104, an electrodialysis cell 106, a power supply 108, and a set of outlet tubes 110. In other embodiments, system 100 includes additional, fewer, or alternative components, including those described elsewhere herein.

Pump 102 is a motorized pump configured to collect a feed fluid 10 from a feed fluid source (not shown) and transfer fluid 10 to cell 106. Pump 102 is in fluid communication with cell 106 through inlet tube 104. In at least some embodiments, system 100 includes a plurality of inlet tubes 104. Alternatively, system 100 may not include pump 102. Rather, in such embodiments, inlet tube 104 is configured to facilitate flow of fluid 10 towards cell 106 without pump 102 (e.g., using pressure or gravity).

Cell 106 is configured to receive fluid 10 and separate fluid 10 into a plurality of output fluids using a predetermined electric current provided by power supply 108. In the exemplary embodiment, cell 106 is a three-compartment electrodialysis cell configured to separate fluid 10 into a dilute output fluid 112, an acidic output fluid 114, and a basic output fluid 116 as described herein. In other embodiments, cell 106 is a two-compartment electrodialysis cell that separates fluid 10 into dilute fluid 112 and one of acidic output fluid 114 and basic output fluid 116.

In the exemplary embodiment, cell 106 includes a housing 118, a core 120, and a membrane assembly 122. Housing 118 is a cylindrical housing including an inlet end 124 and an outlet end 126. In other embodiments, housing 118 may be a different shape and/or include a different number of ends. Inlet end 124 is coupled to inlet tube 104 and outlet end 126 is coupled to output tubes 110. Although inlet end 124 and outlet end 126 are positioned at opposed ends of housing 118, in some embodiments, inlet end 124 and outlet end 126 may be positioned in a different configuration. In one example, inlet end 124 and outlet end 126 are positioned on the same end as each other. Housing 118 defines an internal chamber 128 that is pressured sealed within cell 106. Pressure sealing chamber 128 enables cell 106 to operate in high-pressure environments without requiring the pressure within chamber 128 to be balanced with the ambient pressure external to housing 118. Cell 106 further includes a first electrode 130 that is positioned adjacent housing 118 within chamber 128. First electrode 130 is a flexible mesh electrode. Alternatively, first electrode 130 may be another suitable type of electrode, such as a plate electrode. In the exemplary embodiment, first electrode 130 is a cathode. In other embodiments, electrode 130 is an anode. First electrode 130 is electrically coupled to power supply 108 to receive electric power as described herein.

Core 120 is positioned centrally within chamber 128. In the exemplary embodiment, core 120 extends between inlet end 124 and outlet end 126. Core 120 has a cylindrical shape to facilitate winding membrane assembly 122 as described herein. Core 120 includes a second electrode 132 spaced from first electrode 130. Second electrode 132 is electrically coupled to power supply 108. In the exemplary embodiment, second electrode 132 is a flexible electrode wrapped around core 120. In other embodiments, second electrode 132 may be another suitable type of electrode. Second electrode 132 has the opposite polarity of the polarity of first electrode 130 to facilitate electric current between electrodes. For example, if first electrode 130 is an anode, then second electrode 132 is a cathode.

Membrane assembly 122 is positioned within chamber 128 between first electrode 130 and second electrode 132. In the exemplary embodiment, membrane assembly is coupled to core 120 in a spiral wound configuration. As used herein, a "spiral wound configuration" refers to membrane assembly 122 wrapping around a circumference of core 120 at least once in a spiral shape. Membrane assembly 122 includes a plurality of porous ion exchange membranes that are spaced from each other to define a plurality of fluid channels (not shown in FIG. 1). The ion exchange membranes are configured to selectively inhibit cations and/or anions within fluid 10 from flowing from one fluid channel to an adjacent channel when an electric current is applied between first electrode 130 and second electrode 132 by power supply 108. Separating ions into separate fluid channels creates dilute output fluid 112, acidic output fluid 114, and/or basic output fluid 116.

In the exemplary embodiment, membrane assembly 122 includes an anion exchange membrane 134, a cation exchange membrane, 136, and a bipolar exchange membrane 138. In other embodiments, membrane assembly 122 includes a different number and/or configuration of membranes. In one example, membrane assembly 122 includes bipolar exchange membrane 138 with either anion exchange membrane 134 or cation exchange membrane 136. In another example, membrane assembly 122 includes a plurality of anion exchange membranes 134, cation exchange membranes 136, and/or bipolar exchange membranes 138.

Anion exchange membrane 134, cation exchange membrane, 136, and bipolar exchange membrane 138 are fabricated from a material or combination of materials that include a fixed charged group. That is, anion exchange membrane 134 includes a fixed cationic group, cation exchange membrane 136 includes a fixed anionic group, and bipolar exchange membrane includes both cationic and anionic groups as described herein.

Anion exchange membrane 134 is configured to selectively inhibit cations from passing through anion exchange membrane 134 when current is applied between electrodes 130, 132. More specifically, when current is applied, ions within fluid 10 flow towards an oppositely-charged electrode. That is, anions within feed fluid 10 are attracted to an anode (i.e., either first electrode 130 or second electrode 132) while cations within fluid 10 are attracted to an opposing cathode. The fixed cationic group within anion exchange membrane 134 repels free cations of fluid 10 while facilitating transfer of anions through anion exchange membrane 134 unopposed. Cation exchange membrane 136 is configured similar to anion exchange membrane 134, but rather than selectively inhibiting cations, the fixed anionic group of cation exchange membrane 136 selectively inhibits anions from passing through cation exchange membrane 136.

Bipolar exchange membrane 138 includes an anion layer and a cation layer (neither shown in FIG. 1). Similar to anion and cation exchange membranes 134, 136, the anion layer inhibits cations of fluid 10 from passing through and the cation layer inhibits anions from passing through. As such, bipolar exchange membrane 138 is configured to inhibit both cations and anions of fluid 10 from transferring to an adjacent fluid channel. In at least some embodiments, bipolar exchange membrane 138 is configured for water electrodialysis or water splitting (i.e., separating water molecules into ions). For example, bipolar exchange membrane 138 may include a catalytic material (not shown) that facilitates splitting of non-ion portions of fluid 10 into ions. In the exemplary embodiment, bipolar exchange membrane 138 is coupled between anion exchange membrane 134 and cation exchange membrane 136. In at least some embodiments, the configuration of membrane assembly 122 is repeated and stacked together to form additional fluid channels.

In the exemplary embodiment, membrane assembly 122 further includes one or more spacers 140. Each spacer 140 is coupled between adjacent membranes to define a fluid channel. That is, spacers 140 inhibit adjacent membranes from contacting each other and enable fluid 10 to flow through the fluid channel. Spacers 140 are fabricated from a suitable material or combination of materials that enable spacers 140 to function as described herein.

Power supply 108 is electrically coupled to first and second electrodes 130, 132. In some embodiments, power supply 108 is mechanically coupled to fluid pump 102 and/or electrodialysis cell 106. In one example, power supply 108 is positioned within chamber 128. Power supply 108 is configured to generate direct current (DC) power and supply the DC power to electrodes 130, 132. In certain embodiments, power supply 108 is operable to switch directions of the generated power. For example, during operation of cell 106 with a salt-based fluid 10, solid deposits may form on the porous membranes and block fluid 10 from flowing through the membrane. To remove the solid deposits, power supply is configured to reverse the direction of the power such that the anode becomes the cathode and the cathode becomes the anode. Reversing the power direction may free the deposits from the membrane, thereby unclogging the membrane for transferring ions.

Outlet tubes 110 are configured to transfer the output fluids of cell 106 to an external system (not shown). Each output fluid (i.e., dilute output fluid 112, acidic output fluid 114, and basic output fluid 116) has as least one associated outlet tube 110. In some embodiments, outlet tubes 110 are coupled to another electrodialysis cell 106 to refine the acid and/or base concentrations within at least one of output fluids 112, 114, 116. Alternatively, outlet tubes 110 may be in fluid communication with fluid pump 102 to refine the concentrations.

In one example, system 100 is used in offshore or subsea water injection (i.e., for oil production) to remove multivalent ions in seawater before using the seawater for water injection. Moreover, in the example, membrane assembly 122 and a pipeline in fluid communication with cell 106 may require washing with acids and bases to operate. Rather than store chemicals in the subsea or offshore environment, which may not be economic and/or convenient, system 100 is configured to generate the acids and bases on-site.

Figure 2:
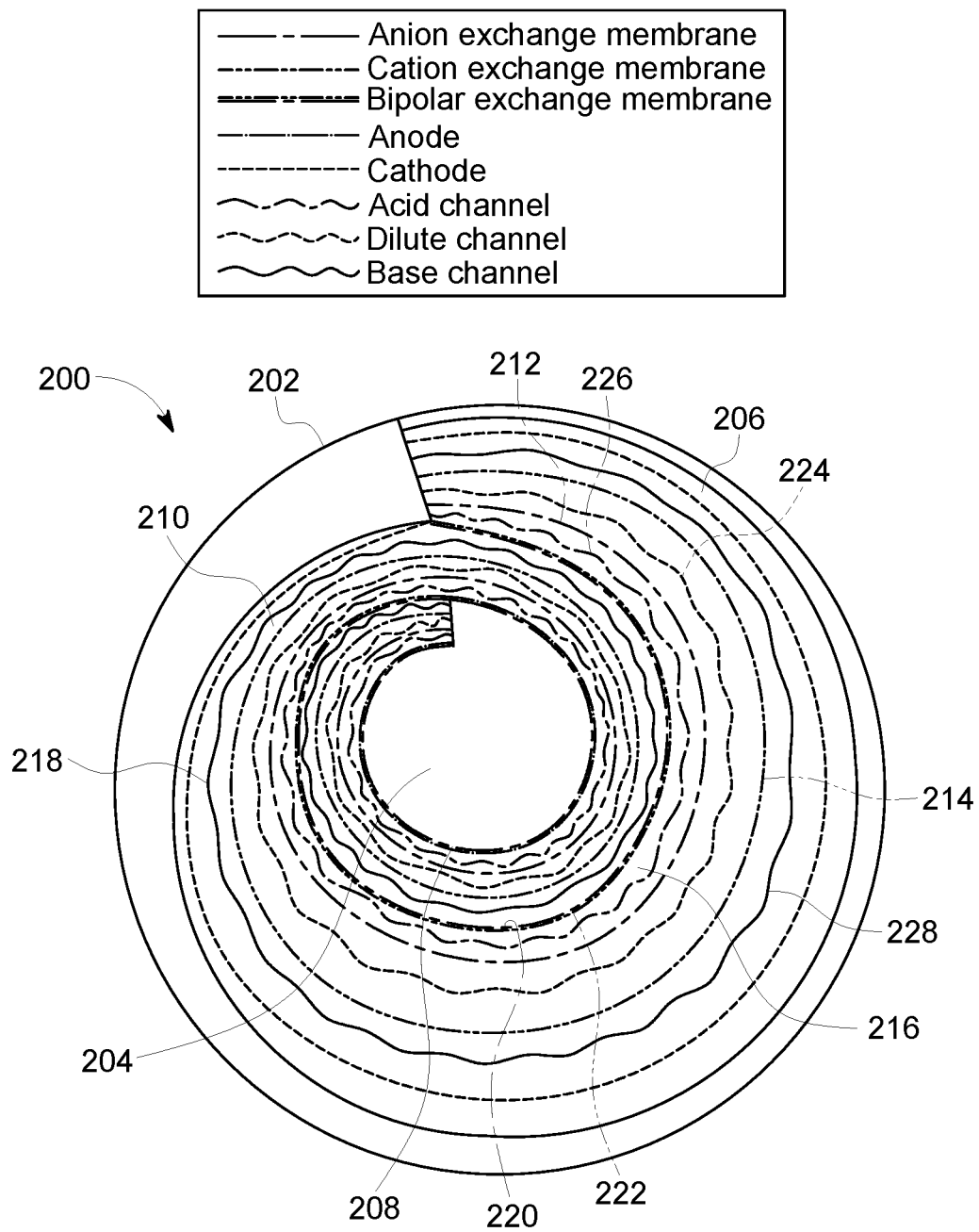
FIG. 2 is a cross-sectional view of an exemplary electrodialysis cell that may be used in the system shown in FIG. 1.

FIG. 2 is a radial cross-sectional view of an exemplary electrodialysis cell 200 that may be used with system 100 (shown in FIG. 1). Cell 200 is substantially similar to electrodialysis cell 106 (shown in FIG. 1). Cell 200 includes a housing 202, a core 204, a first electrode 206, a second electrode 208, and a membrane assembly 210. In the exemplary embodiment, first electrode 206 is an anode and second electrode 208 is a cathode. Alternatively, first electrode 206 is the cathode and second electrode 208 is the anode. In other embodiments, cell 200 includes additional, fewer, or alternative components, including those described elsewhere herein.

In the exemplary embodiment, core 204 is concentric with housing 202. First electrode 206 is positioned adjacent to housing 202 and second electrode 208 is coupled to core 204. Membrane assembly 210 is positioned between first electrode 206 and second electrode 208. Membrane assembly 210 is in a spiral wound configuration around core 204. In at least some embodiments, membrane assembly 210 is coupled to housing 202 and/or first electrode 206. Membrane assembly 210 is configured to facilitate fluid flow through cell 200 normal to the plane shown in FIG. 2. As a feed fluid travels through membrane assembly 210, an electric current is applied to first and second electrodes 206, 208 to separate the feed fluid into a plurality of output fluids using membrane assembly 210.

In the exemplary embodiment, membrane assembly 210 includes an anion exchange membrane 212, a cation exchange membrane 214, and a bipolar exchange membrane 216 that are spaced from each other (e.g., using spacers) to define a plurality of fluid channels 218. Bipolar exchange membrane 216 includes an anion layer 220 and a cation layer 222 that are coupled adjacent each other. Based on the fixed charge group of adjacent membranes, fluid channels 218 are separated into three subset channels: a dilute channel 224, an acid channel 226, and a base channel 228. During operation of cell 200, the feed fluid is separated such that dilute channel 224 facilitates fluid communication of a dilute output fluid, acid channel 226 facilitates fluid communication of an acidic output fluid, and base channel 228 facilitates fluid communication of a basic output fluid.

For example, when current is applied to first and second electrodes 206, 208 and a feed fluid is received in fluid channels 218, cations within the fluid are attracted to the cathode and anions are attracted to the anode. In the exemplary embodiment, cations and anions move radially towards electrodes 206 and 208. If one or more anion or bipolar exchange membranes 212, 216 are positioned between the cations and the cathode, the cations are blocked from advancing further towards the cathode. Similarly, if one or more cation or bipolar exchange membranes 214, 216 are positioned between the anions and the anode, the anions are blocked from advancing further towards the anode, thereby separating the feed fluid into different fluid channels 218 having different acid and base concentrations.

Figure 13:
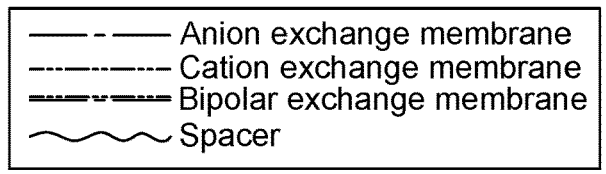
FIG. 13 is a cross-sectional view of an exemplary multi-leaves membrane assembly that may be used in the system shown in FIG. 1.
Figure 13:
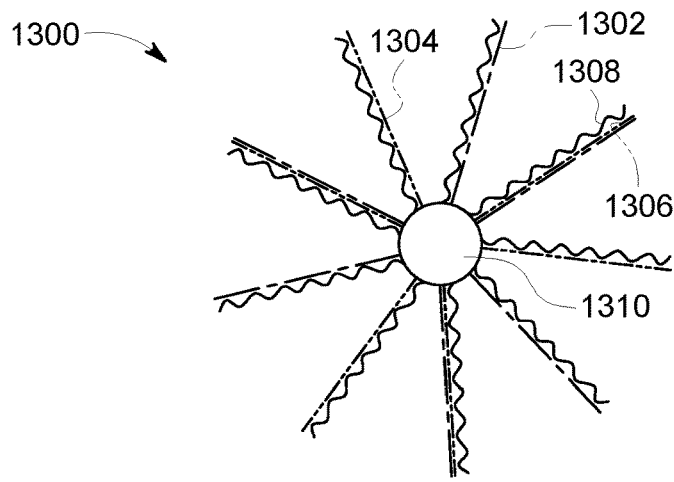
Figure 14:
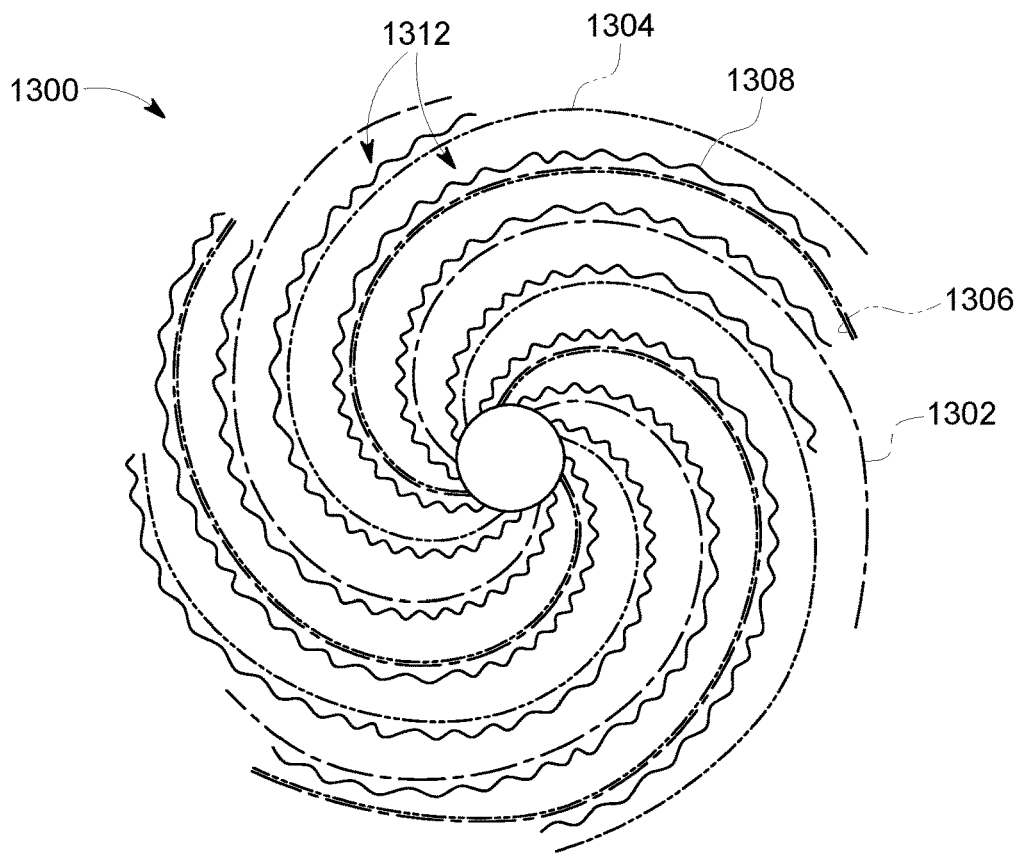
FIG. 14 is a cross-sectional view of the membrane assembly shown in FIG. 13 in the spiral wound configuration.

FIGS. 13 and 14 are cross-sectional views of an exemplary multi-leaves membrane assembly 1300 that may be used with system 100 (shown in FIG. 1). More specifically, FIG. 13 is a cross-sectional view of membrane assembly 1300 during assembly and FIG. 14 is a cross-sectional view of membrane assembly 1300 in the spiral wound configuration. Membrane assembly 1300 is substantially similar to membrane assembly 210 (shown in FIG. 2). Unlike membrane assembly 210, which includes a single membrane for each type of membrane that is wound around a core (i.e., a single leaf design), membrane assembly 1300 includes a plurality of ion exchange membranes that are circumferentially spaced from each other and radially extending to form fluid channels. In the exemplary embodiment, membrane assembly 1300 includes a plurality of anion exchange membranes 1302, a plurality of cation exchange membranes 1304, a plurality of bipolar exchange membranes 1306, and a plurality of spacers 1308. In other embodiments, membrane assembly 1300 includes additional, fewer, or alternative components, including those described elsewhere herein.

With respect to FIGS. 13 and 14, in the exemplary embodiment, membrane assembly 1300 is coupled to a core 1310 such that each membrane 1302, 1304, and 1306 and spacer 1308 extends radially from core 1310. Membranes 1302, 1304, and 1306 are circumferentially spaced from each other to define a plurality of fluid channels 1312 (shown in FIG. 14). Each spacer 1308 is positioned between two membranes of membrane assembly 1300 to define fluid channels 1312. In the exemplary embodiment, each membrane 1302, 1304, and 1306 is positioned between ion exchange membranes of a different type to facilitate selective transfer of ions between fluid channels 1312. For example, each anion exchange membrane 1302 is positioned between one cation exchange membrane 1304 and one bipolar exchange membrane 1306.

During assembly of an electrodialysis cell (e.g., cell 106, shown in FIG. 1), membrane assembly 1300 is positioned within an internal chamber of a housing (not shown in FIGS. 13 and 14) in the spiral wound configuration. That is, fluid channels 1312 extend from core 1310 radially in a curve. In one example, core 1310 is twisted when membrane assembly 1300 is coupled to core 1310 to position membrane assembly 1300 in the spiral wound configuration.

Figure 3:
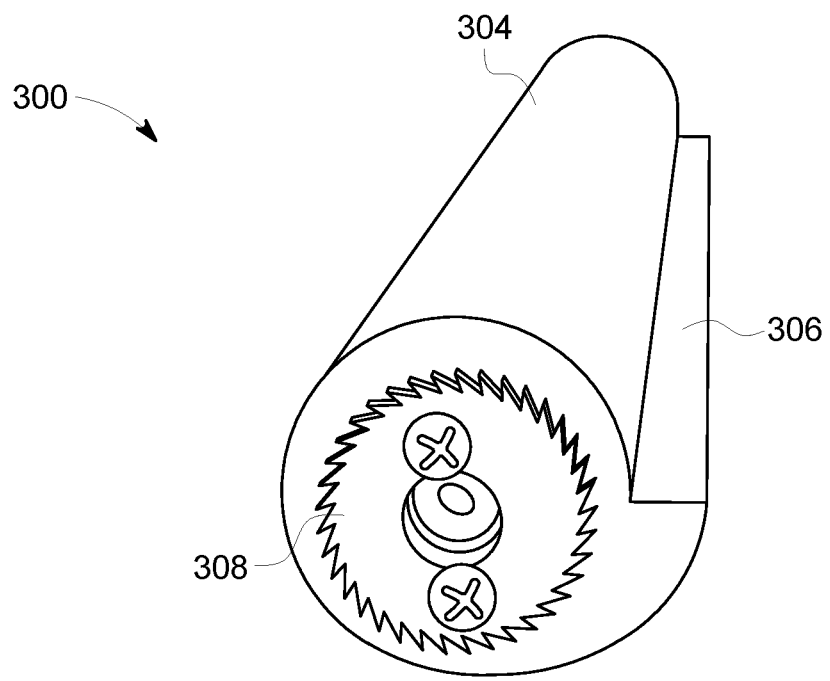
FIG. 3 is a side perspective view of an exemplary core that may be used in the system shown in FIG. 1.
Figure 4:
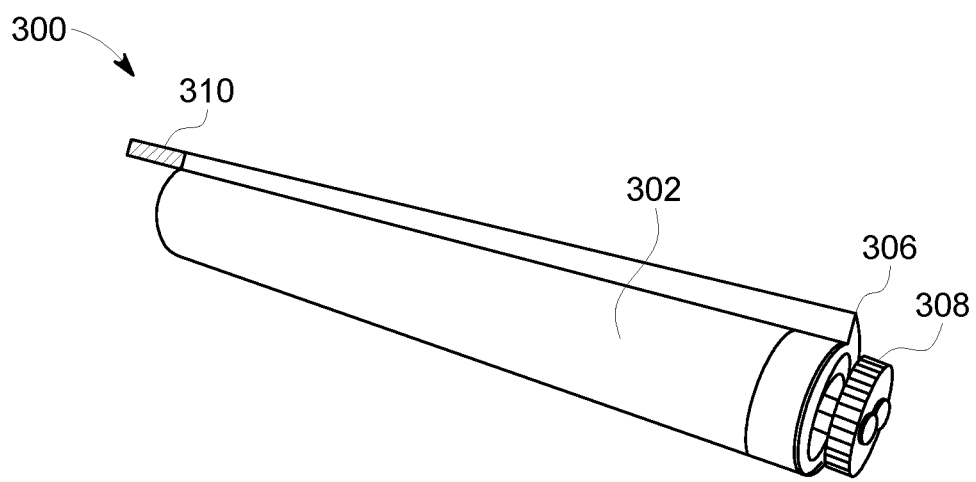
FIG. 4 is a perspective view of the core shown in FIG. 3 with an exemplary mesh electrode.

FIGS. 3 and 4 are perspective views of an exemplary core 300 that may be used with system 100 (shown in FIG. 1). More specifically, FIG. 3 is a perspective view of core 300 without an electrode and FIG. 4 is a perspective view of core 300 with an electrode 302. Core 300 is fabricated from any suitable rigid material or combination of materials to function as described herein.

With respect to FIGS. 3 and 4, in the exemplary embodiment, core 300 includes a core body 304, a lip portion 306, and a rotating member 308. Core body 304 is shaped and sized to facilitate coupling to a membrane assembly (not shown in FIGS. 3 and 4) in the spiral wound configuration. In the exemplary embodiment, core body 304 has a cylindrical shape and extends between inlet end 124 and outlet end 126 (shown in FIG. 1). Core body 304 does not transfer fluid between inlet end 124 and outlet end 126, but rather provides structural support to the membrane assembly. Lip portion 306 extends radially from core body 304 and is configured to couple to electrode 302 and the membrane assembly. Lip portion 306 is sized to have the same or similar height as the membrane assembly such that the wound layers of the membrane assembly are in face-to-face contact with each other along a substantial length of the membrane assembly. In the exemplary embodiment, lip portion 306 is integrated within core body 304. In other embodiments, lip portion 306 is a separate component coupled to core body 304.

Rotating member 308 is configured to enable rotation of core 300 to assemble the electrodialysis cell. More specifically, rotating member 308 facilitates rotation of core 300 using a rotation mechanism (not shown), such as a crank. In the exemplary embodiment, rotating member 308 is a gear. In other embodiments, rotating member 308 may be a different component or mechanism. In some embodiments, rotating member 308 is removably coupled to core body 304 such that rotating member 308 is removed when the electrodialysis cell is assembled.

Electrode 302 is coupled to an external surface of core body 304 using adhesive, fasteners, welding, and/or any other suitable fastening means. In the exemplary embodiment, electrode 302 is a flexible mesh electrode. In one example, electrode 302 is a ruthenium oxide-coated titanium mesh electrode. In another example, electrode 302 is an iridium oxide-coated titanium mesh electrode. Alternatively, electrode 302 may be a plate electrode. Electrode 302 includes an outwardly extending tab 310. Tab 310 is electrically coupled to power supply 108 (shown in FIG. 1) to provide power to electrode 302.

Figure 5:
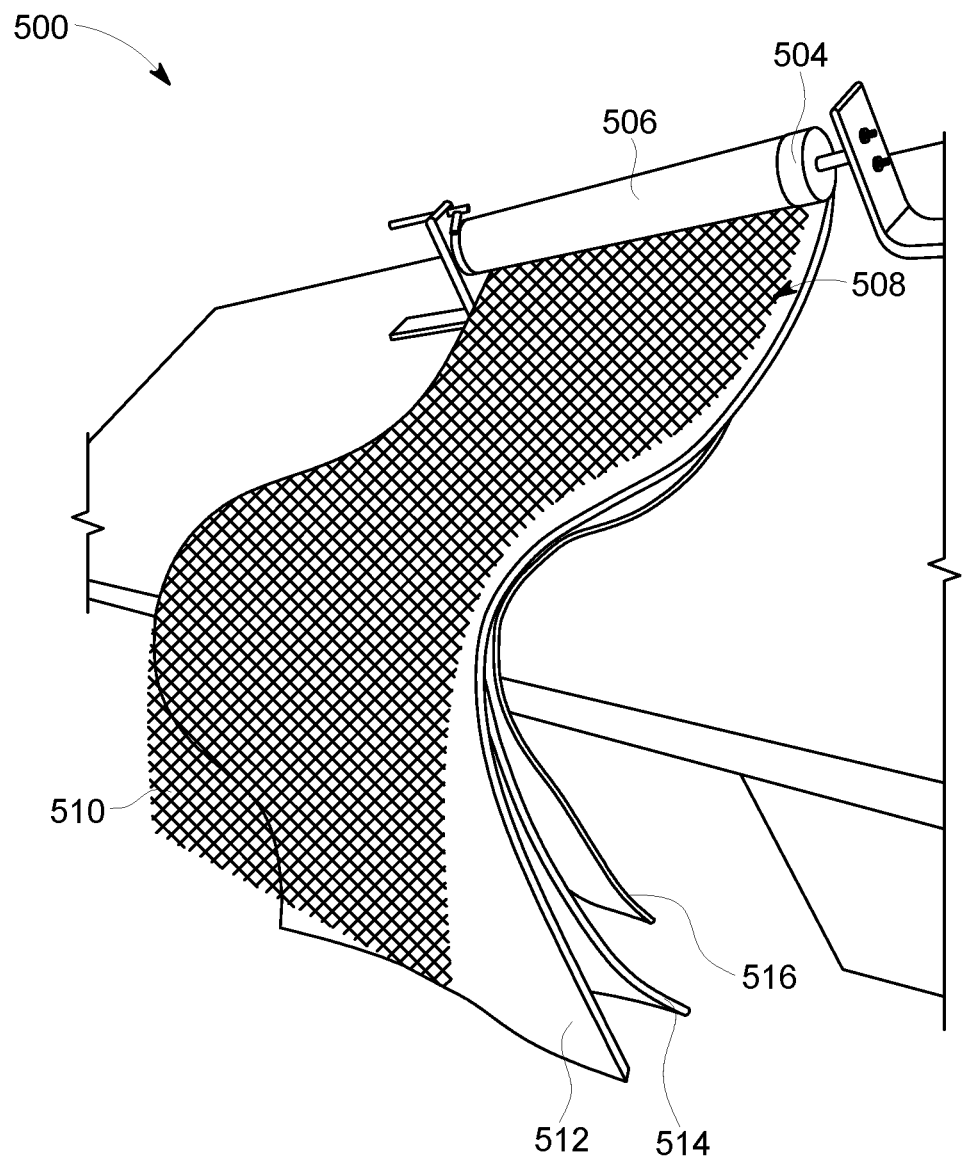
FIG. 5 is a perspective view of an exemplary partial, unrolled electrodialysis cell for use in the system shown in FIG. 1.
Figure 6:
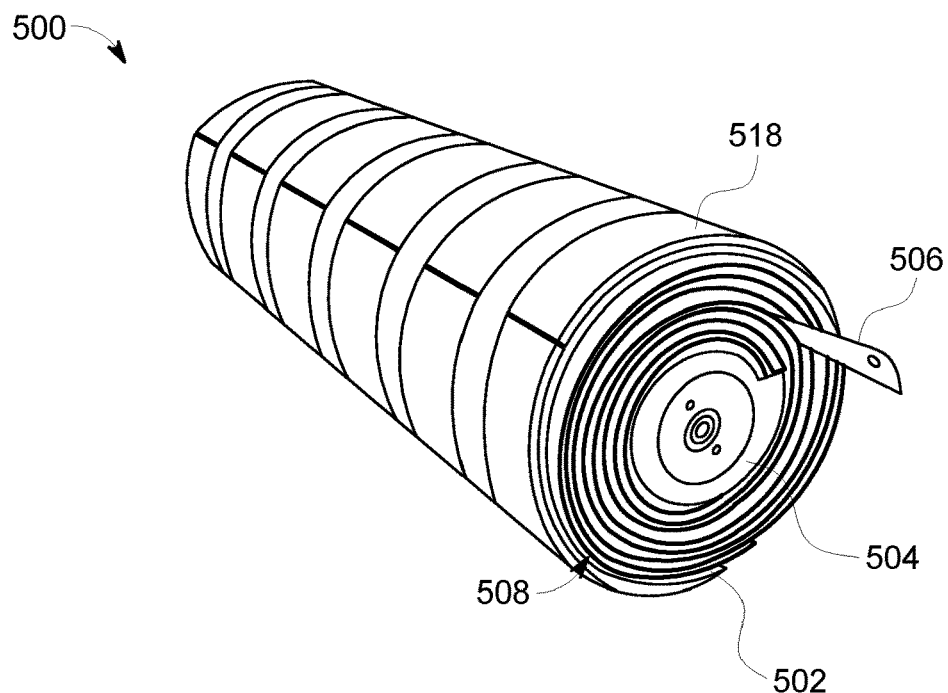
FIG. 6 is a perspective view of the cell shown in FIG. 5 in a spiral wound configuration.

FIGS. 5 and 6 are exemplary perspective views of a partial electrodialysis cell 500 during assembly that may be used in system 100 (shown in FIG. 1). More specifically, FIG. 5 is a perspective view of cell 500 prior to winding and FIG. 6 is a perspective view of cell 500 in the spiral wound configuration. Cell 500 is substantially similar to cell 106 (shown in FIG. 1). Cell 500 includes a first electrode 502 (shown in FIG. 6), a core 504, a second electrode 506, and a membrane assembly 508. In other embodiments, cell 500 includes additional, fewer, or alternative components, including those described elsewhere herein.

Membrane assembly 508 includes a spacer 510, an anion exchange membrane 512, a cation exchange membrane 514, and a bipolar exchange membrane 516. Additional spacers are hidden for clarity purposes. Membrane assembly 508 is stacked together and coupled to core 504. Core 504 is rotated (e.g., using a crank or other rotational mechanism) to wind membrane assembly around core 504 in the spiral wound configuration. After winding membrane assembly 508 in the spiral wound configuration, first electrode 502 is coupled to membrane assembly 508. In the exemplary embodiment, first electrode 502 is a flexible stainless steel electrode. In other embodiments, first electrode 502 is fabricated from another suitable material or combination of materials. First electrode 502 is coupled to membrane assembly 508 using any suitable means, such as adhesive, fasteners, and welding.

In the exemplary embodiment, to adjust the diameter of the spiral wound membrane assembly 508, an outer layer 518 (shown in FIG. 6) is circumferentially coupled to first electrode 502. More specifically, the diameter of outer layer 518 is increased or decreased to adjust the outer diameter of membrane assembly 508 to fit within a housing (e.g., housing 118, shown in FIG. 1). Outer layer 518 is secured to first electrode 502 using any suitable means, such as adhesive, clamps, and the like. In the exemplary embodiment, outer layer 518 is fabricated from rubber. In other embodiments, outer layer 518 is fabricated from a different suitable material or combination of materials. In other embodiments, cell 500 does not include outer layer 518.

Figure 7:
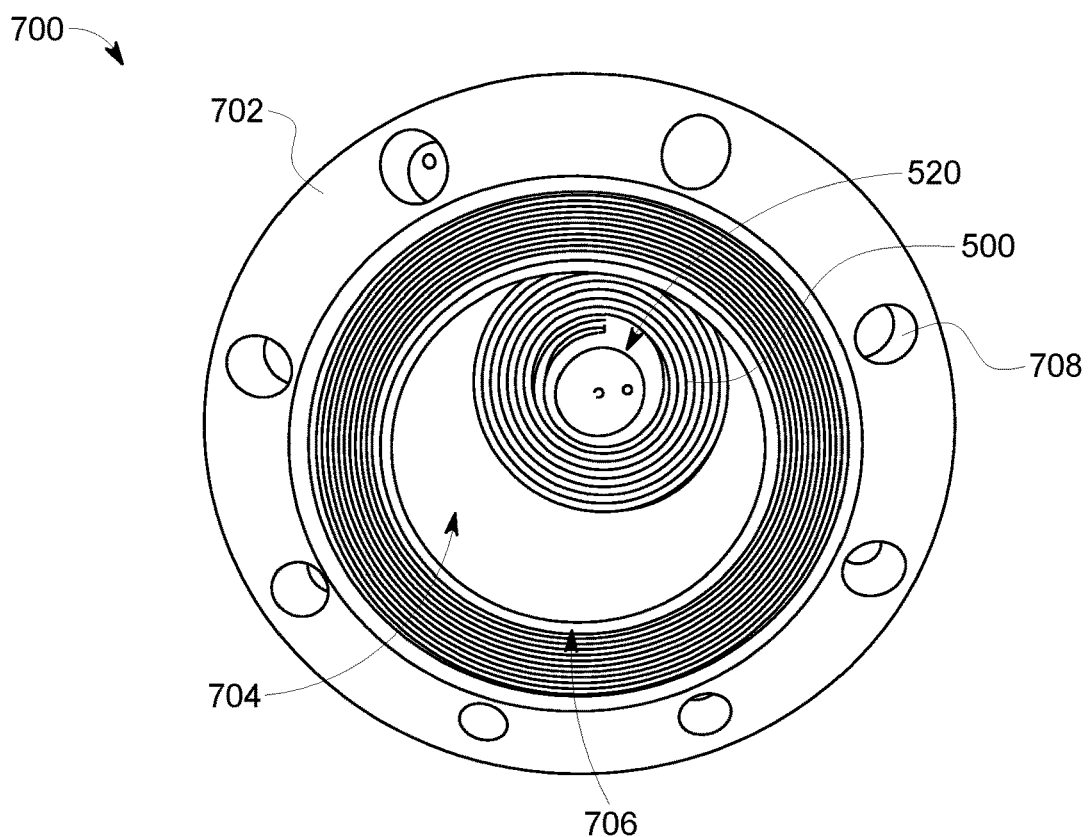
FIG. 7 is a perspective view of an exemplary inlet end of the cell shown in FIG. 6.

FIG. 7 is an exemplary inlet end 702 of a housing 700 that may be used with cell 500 (shown in FIG. 6). In the exemplary embodiment, the partial cell 500 is inserted within an internal chamber 704 of housing 700 for assembly. Inlet end 702 defines an opening 706 to receive cell 500. Opening 706 is sized and shaped to facilitate inserting cell 500 within chamber 704. When cell 500 is fully inserted into housing 700, a first end 520 of cell 500 is proximate opening 706 to facilitate receiving a feed fluid within the fluid channels. That is, the fluid channels receive the feed fluid at first end 520 and transfers the feed fluid to an opposing end of cell 500 to separate the feed fluid. In other embodiments, first end 520 is spaced from opening 706.

Figure 8:
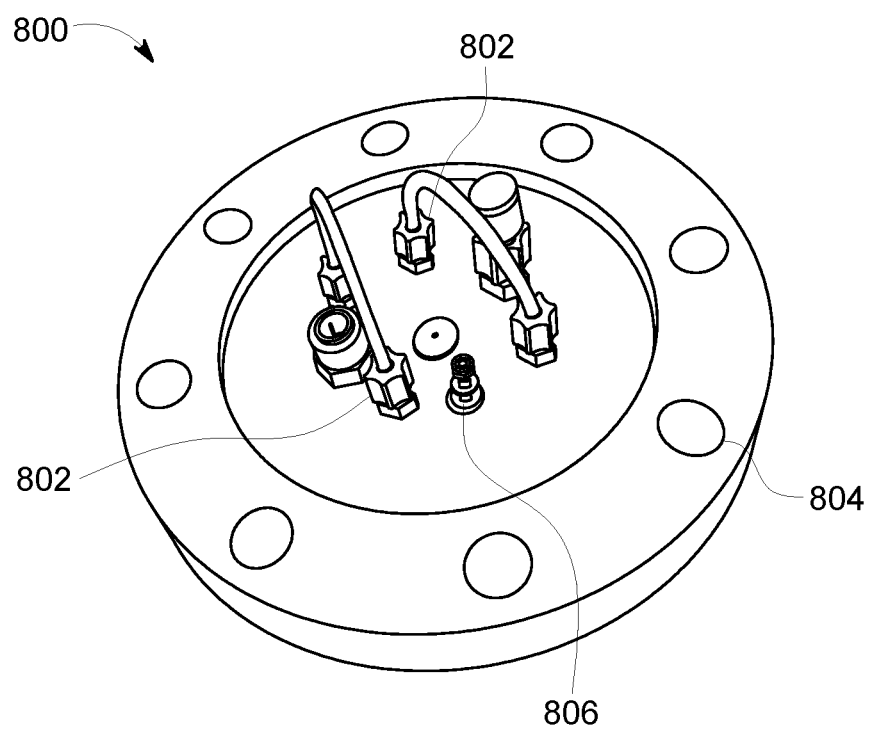
FIG. 8 is a perspective view of an exemplary inlet cap coupleable to the inlet end shown in FIG. 7.

FIG. 8 is an exemplary inlet cap 800 that may be used with housing 700 (shown in FIG. 7) to receive the feed fluid and pressure seal chamber 704. In the exemplary embodiment, inlet cap 800 includes a plurality of inlet nozzles 802, a plurality of fastener openings 804, and an electrode connector 806. In other embodiments, inlet cap 800 includes additional, fewer, or alternative components, including those described elsewhere herein.

With respect to FIGS. 7 and 8, inlet cap 800 is removably coupled to inlet end 702. In the exemplary embodiment, inlet cap 800 and inlet end 702 are configured to form a pressure seal. Inlet cap 800 and/or inlet end 702 may include any suitable components and/or integral features that facilitate forming the pressure seal. For example, fastener openings 804 are aligned with a corresponding plurality of fastener openings 708 of inlet end 702. A fastener e.g., without limitation, bolts and screws, is inserted in each pair of aligned fastener openings 708, 804 to couple inlet end 702 and inlet cap 800 together. In certain embodiments, legs or other components are inserted in fastener openings 708, 804. To seal inlet cap 800 to inlet end 702, a sealing material (e.g., polyurethane) may be applied between cap 800 and inlet end 702. Alternatively, inlet cap 800 is integrally formed with inlet end 702.

Inlet nozzles 802 are configured to receive a feed fluid and transfer the fluid to inlet end 702. In other embodiments, inlet cap 800 includes a different number of inlet nozzles 802 (including one). Nozzles 802 provide the feed fluid to every fluid channel of cell 500. Nozzles 802 are positioned proximate to the fluid channels to inhibit a shunt current from developing between the electrodes of cell 500. Electrode connector 806 is electrically coupled to a first electrode of cell 500 and provides power to the first electrode from a power supply (e.g., power supply 108, shown in FIG. 1).

Figure 9:
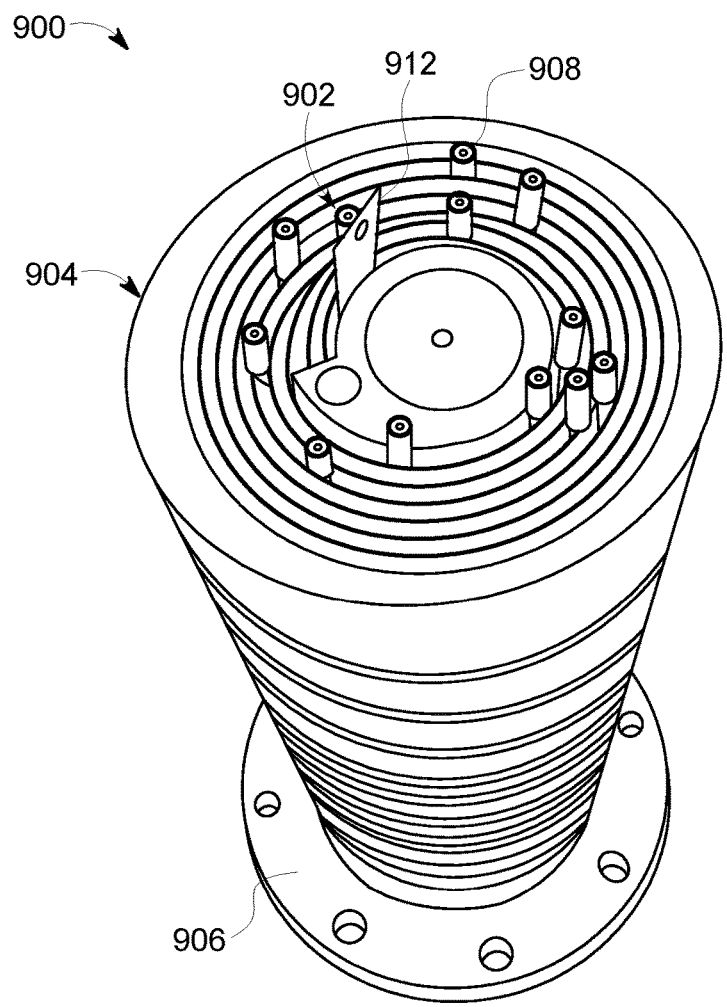
FIG. 9 is a top perspective view of the cell shown in FIG. 6 with a plurality of outlet seals.
Figure 10:
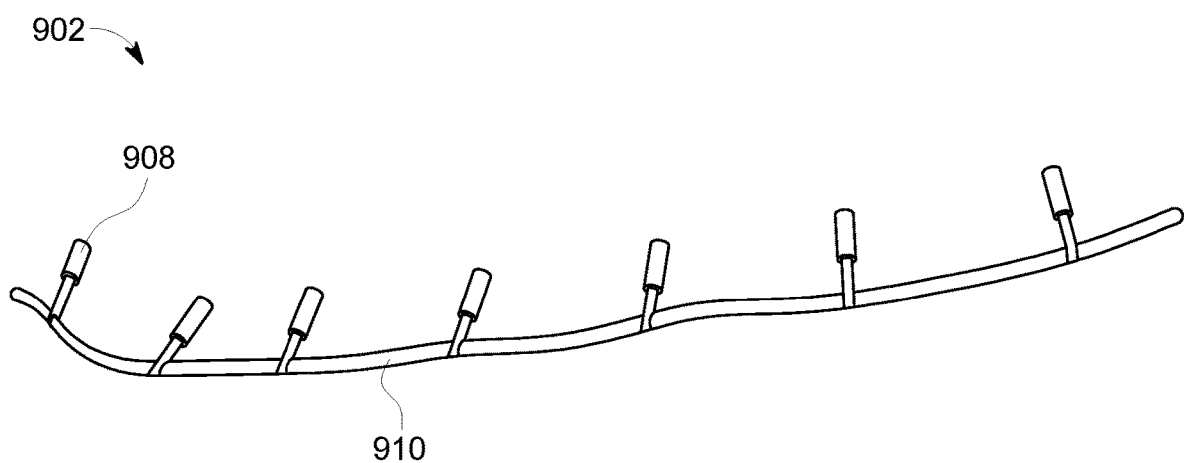
FIG. 10 is a perspective view of an exemplary outlet seal that may be used with the cell shown in FIG. 6.

FIGS. 9 and 10 show exemplary outlet seals 902 for an electrodialysis cell 900. More specifically, FIG. 9 is a perspective view of cell 900 with a plurality of outlet seals 902, and FIG. 10 is a perspective view of outlet seal 902. Cell 900 is substantially similar to cells 106, 500 (shown in FIGS. 1 and 6, respectively).

With respect to FIGS. 9 and 10, outlet seals 902 are coupled to cell 900 at an outlet end 904. In the exemplary embodiment, outlet end 904 is opposite an inlet end 906 of cell 900 to transfer a plurality of output fluids from cell 900. Outlet seals 902 are coupled to cell 900 at a first end of the fluid channels. Outlet seals 902 include one or more outlet nozzles 908 that are configured to facilitate fluid communication between the fluid channels and an external system (not shown). Nozzles 908 are removably coupled to a set of outlet tubes (e.g., outlet tubes 110, shown in FIG. 1). In at least some embodiments, nozzles 908 are at least partially fabricated from polylactic acid to inhibit decomposition of nozzles 908 in the acidic or basic output fluids. Nozzles 908 may be fabricated from, without limitation, polypropylene, polyethylene, acrylonitrile butadiene styrene, polyvinyl chloride (PVC), and/or other suitable materials or combination of materials. Nozzles 908 for the basic output fluids may further be coated with polyvinyl chloride (PVC) to improve the chemical stability of nozzles 908.

Outlet seals 902 further include a sealing member 910 coupled to outlet nozzles 908. Sealing member 910 is sized and shaped to extend the entire length and width of a respective fluid channel. Sealing member 910 is configured to block fluids from exiting the fluid channel except through nozzles 908. Nozzles 908 are spaced apart from each other on sealing member 910 to retrieve the output fluids from the fluid channels. During assembly, nozzles 908 from different outlet seals 902 are spaced from each other to provide sufficient space to couple the outlet tubes to each nozzle 908. Sealing member 910 is fabricated from a suitable material or combination of materials that is nonporous and chemically stable in acidic and/or basic solutions. In one example, sealing member 910 is fabricated from rubber.

In the exemplary embodiment, outlet end 904 is sealed with polyurethane to limit access to the fluid channels through outlet nozzles 908. In other embodiments, outlet end 904 is coupled to cap to form a pressure seal. An electrode tab 912 of a second electrode (not shown in FIGS. 9 and 10) and outlet nozzles 908 extend beyond the polyurethane seal to facilitate external access.

Figure 11:
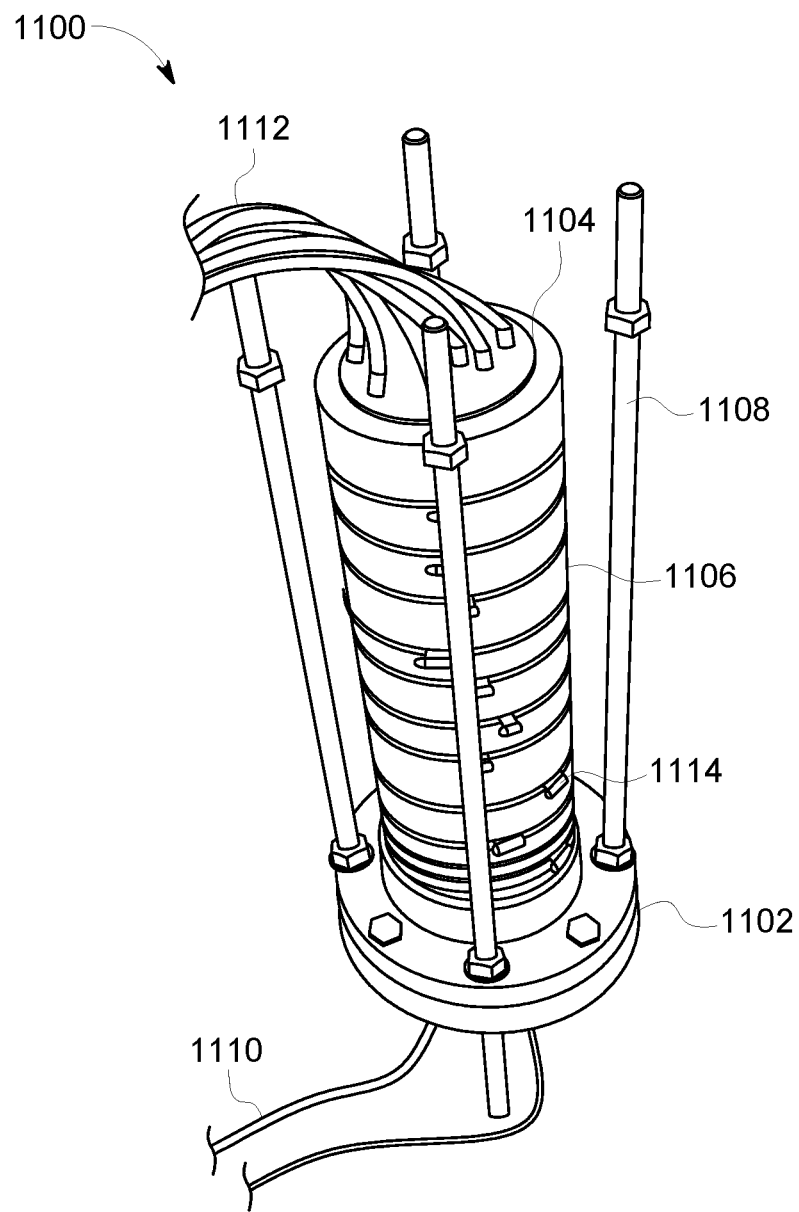
FIG. 11 is a perspective view of an exemplary assembled electrodialysis cell that may be used in the system shown in FIG. 1.

FIG. 11 is a perspective view of an assembled exemplary electrodialysis cell 1100 that may be used with system 100 (shown in FIG. 1). Cell 1100 is substantially similar to cells 106, 500, and 900 (shown in FIGS. 1, 6, and 9, respectively). Cell 1100 includes an inlet end 1102, an outlet end 1104, a housing 1106, and a plurality of supports 1108. In comparison to some known plate and frame electrodialysis configurations, cell 1100 has a reduced footprint, which enables cell 1100 to be installed in environments with limited space. In other embodiments, cell 1100 includes additional, fewer, or alternative components, including those described elsewhere herein.

Inlet end 1102 is in fluid communication with an inlet tube 1110 to receive the feed fluid. In the exemplary embodiment, supports 1108 extend through inlet end 1102 to support cell 1100. The feed fluid flows through a membrane assembly (not shown in FIG. 11) of cell 1100 to separate into a plurality of output fluids. The output fluids are transferred to a set of outlet tubes 1112 coupled to outlet end 1104.

In the exemplary embodiment, housing 1106 includes a plurality of circle clamps 1114. Circle clamps 1114 are secured to housing 1106 to reinforce cell 1100. In other embodiments, housing 1106 includes additional or alternative components to reinforce cell 1100.

Figure 12:
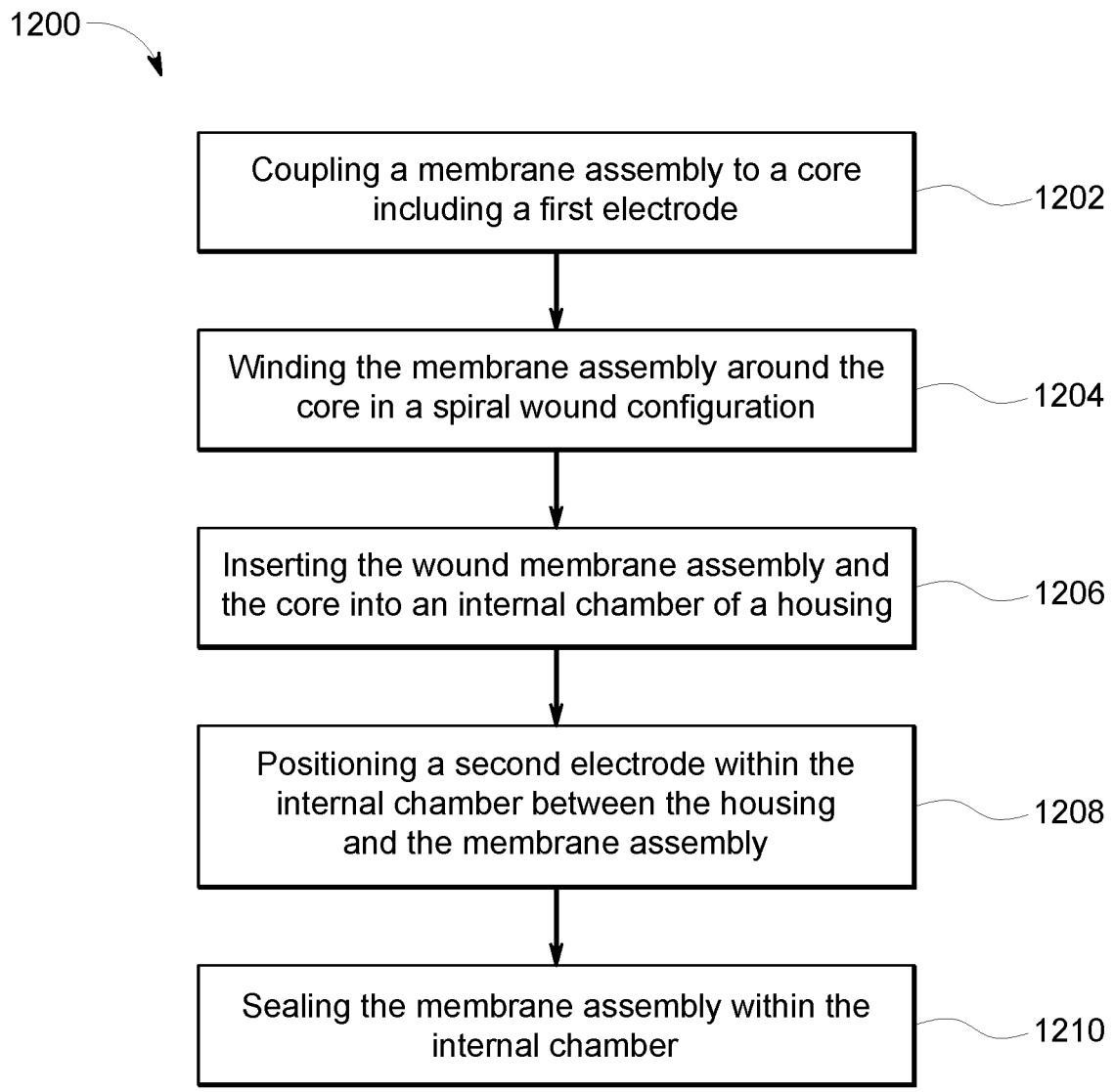
FIG. 12 is a flow diagram of an exemplary method for assembling an electrodialysis cell that may be used with the system shown in FIG. 1.

FIG. 12 is a flow diagram of an exemplary method 1200 for assembling an electrodialysis cell that may be used with system 100 (shown in FIG. 1). In other embodiments, method 1200 includes additional, fewer, or alternative steps, including those described elsewhere herein.

With respect to FIGS. 1 and 12, in the exemplary embodiment, membrane assembly 122 is coupled 1202 to core 120. Membrane assembly 122 is then wound 1204 around core 120 in the spiral wound configuration. Core 120 and membrane assembly 122 are inserted 1206 into internal chamber 128 of housing 118. In the exemplary embodiment, a cap or removable component is removably coupled to inlet end 124 and/or outlet end 126 to facilitate inserting 1206 core 120 and membrane assembly 122 inside chamber 128. First electrode 130 is positioned 1208 between housing 118 and membrane assembly 122 within internal chamber 128 such that membrane assembly 122 is positioned between first electrode 130 and second electrode 132. After core 120, membrane assembly 122, first electrode 130, and second electrode 132 are within chamber 128, membrane assembly 122 is sealed 1210 within chamber 128. In at least some embodiments, the removable cap is secured to inlet end 124 and/or outlet end 126 to seal 1210 membrane assembly 122 in chamber 128. Additionally or alternatively, polyurethane or another sealant may be applied to inlet end 124 and/or outlet end 126. The fluid channels defined by membrane assembly 122 are in fluid communication with inlet end 124 and outlet end 126 to receive feed fluid 10 and to transfer output fluids 112, 114, and 116 from cell 106 while membrane assembly 122 is sealed 1210 within chamber 128.

The above-described systems and methods facilitate spiral-wound, bipolar electrodialysis cells for facilitating desalinization in relatively high-pressure environments (e.g., seawater). Specifically, the above-described systems and methods include at least one electrodialysis cell including a housing, a core, a first electrode, a second electrode, and a membrane assembly. The housing defines an internal chamber and includes an inlet end that receives a feed fluid and an outlet end in fluid communication with the inlet end. The core is positioned in the internal adjacent to the housing. The second electrode is coupled to the core and is spaced from the first electrode. The electrodes are electrically coupled to a power supply to receive power. The membrane assembly is positioned between the first and second electrodes in a spiral wound configuration around the core. The membrane assembly includes a plurality of ion exchange membranes that are spaced apart from each other to define a plurality of fluid channels between the inlet end and the outlet end. The membrane assembly receives the feed fluid and separates the feed fluid into a plurality of output fluids when a predetermined electric current is applied between the first and second electrodes by inhibiting ions from passing through the ion exchange membranes.

An exemplary technical effect of the methods, systems, and apparatus described herein includes at least one of: (a) facilitating the use electrodialysis cells in high-pressure environments, such as deep-sea applications; (b) reducing the footprint of electrodialysis cells; and (c) reducing or otherwise eliminating shunt current between electrodes.

Exemplary embodiments of spiral-wound, bipolar electrodialysis cells and methods for assembling the same are described above in detail. The method and systems described herein are not limited to the specific embodiments described herein, but rather, components of systems or steps of the methods may be utilized independently and separately from other components or steps described herein. For example, the methods may also be used in combination with multiple electrodialysis cells, and are not limited to practice with only electrodialysis systems as described herein. Additionally, the methods may also be used with other components, and are not limited to practice with only the components as described herein. Rather, the exemplary embodiments may be implemented and utilized in connection with many other devices that have components that need to be replaced over time.

Although specific features of various embodiments may be shown in some drawings and not in others, this is for convenience only. In accordance with the principles of the systems and methods described herein, any feature of a drawing may be referenced or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrodialysis cell comprising:
a housing defining an internal chamber, the housing comprising:
an inlet end configured to receive a feed fluid; and
an outlet end in fluid communication with the inlet end;
a core positioned within the internal chamber of the housing;
a first electrode positioned in the internal chamber adjacent the housing;
a second electrode coupled to the core and spaced from the first electrode; and
a membrane assembly positioned between the first electrode and the second electrode in a spiral wound configuration, the membrane assembly comprising a plurality of ion exchange membranes spaced from each other to define a plurality of fluid channels between the inlet end and the outlet end, and the membrane assembly is configured to separate the feed fluid into a dilute output fluid and at least one of an acidic output fluid and a basic output fluid, wherein the membrane assembly comprises:
a bipolar exchange membrane configured to inhibit ions of the feed fluid from passing through the bipolar exchange membrane when a predetermined electric current is applied between the first electrode and the second electrode; and
at least one of an anion exchange membrane and a cation exchange membrane;
wherein the core is coupled to the membrane assembly.

2. The electrodialysis cell in accordance with claim 1, wherein the bipolar exchange membrane comprises:
a cation layer configured to inhibit anions from passing through the cation layer when the predetermined current is applied; and
an anion layer positioned adjacent the cation layer, the anion layer configured to inhibit cations from passing through the anion layer when the predetermined current is applied.

3. The electrodialysis cell in accordance with claim 1, wherein the anion exchange membrane is configured to inhibit cations of the feed fluid from passing through the anion exchange membrane when a predetermined electric current is applied between the first electrode and the second electrode and the cation exchange membrane is configured to inhibit anions of the feed fluid from passing through the cation exchange membrane when the predetermined electric current is applied.

4. The electrodialysis cell in accordance with claim 1, wherein the plurality of fluid channels comprises:
   a dilute channel configured to deliver the dilute output fluid to the outlet end;
   an acid channel configured to deliver the acidic output fluid to the outlet end; and
   a base channel configured to deliver the basic output fluid to the outlet end.

5. The electrodialysis cell in accordance with claim 1, wherein the membrane assembly further comprises a spacer positioned between two ion exchange membranes of the plurality of ion exchange membranes, the spacer configured to define a respective fluid channel of the plurality of fluid channels.

6. The electrodialysis cell in accordance with claim 1, wherein the core comprises a core body extending between the inlet end and the outlet end, wherein the second electrode is one of a mesh electrode and a plate electrode coupled to the core body.

7. The electrodialysis cell in accordance with claim 6, wherein the core further comprises a lip portion radially extending from the core body, the lip portion coupled to the membrane assembly.

8. The electrodialysis cell in accordance with claim 1 further comprising a plurality of outlet seals, each outlet seal of the plurality of outlet seals coupled to a respective fluid channel of the plurality of fluid channels, the each outlet seal comprising:
   a sealing member; and
   a plurality of outlet nozzles extending from the sealing member, the plurality of outlet nozzles configured to facilitate fluid communication between the outlet end and the respective fluid channel.

* * * * *